United States Patent [19]

Kuramochi

[11] Patent Number: 5,336,442
[45] Date of Patent: Aug. 9, 1994

[54] EXTENSION TYPE CONDUCTIVE RUBBER AND PROCESS FOR MAKING AND METHOD FOR USING SAME

[75] Inventor: Hiroshi Kuramochi, Kawaguchi, Japan

[73] Assignee: Kabushiki Kaisha Fine Rubber Kenkyuusho, Kawaguchi, Japan

[21] Appl. No.: 482,875

[22] Filed: Feb. 21, 1990

[51] Int. Cl.$^5$ ............... H01B 1/00; H01B 1/20; H01B 1/24

[52] U.S. Cl. ................... 252/511; 252/510; 524/495; 524/496; 524/588; 325/100; 325/105; 325/106

[58] Field of Search ............ 252/500, 510, 511, 512; 505/802; 524/495, 496, 500, 588; 525/100, 105, 106

[56] References Cited

U.S. PATENT DOCUMENTS

| | | | |
|---|---|---|---|
| 3,706,695 | 12/1972 | Huebner et al. | 252/511 |
| 4,011,360 | 3/1977 | Walsh | 252/514 |
| 4,098,945 | 7/1978 | Oehnke | 252/500 |
| 4,130,707 | 12/1978 | Leiser et al. | 252/514 |
| 4,138,369 | 2/1979 | Arai et al. | 252/520 |
| 4,145,317 | 3/1979 | Sado et al. | 252/511 |
| 4,228,194 | 10/1980 | Meeder | 427/113 |
| 4,273,682 | 6/1981 | Kamamori | 252/511 |
| 4,273,697 | 6/1981 | Sumimura et al. | 252/511 |
| 4,302,361 | 11/1981 | Kotani et al. | 252/520 |
| 4,357,266 | 11/1982 | Sado et al. | 252/511 |
| 4,382,024 | 5/1983 | Seaman et al. | 252/503 |
| 4,387,046 | 6/1983 | Marsch et al. | 252/511 |
| 4,500,447 | 2/1985 | Kobayashi et al. | 505/802 |
| 4,505,847 | 3/1985 | Jackson | 252/511 |
| 4,533,604 | 8/1985 | Honda et al. | 252/511 |
| 4,772,522 | 9/1988 | Kubota et al. | 427/128 |
| 4,774,023 | 9/1988 | Jackson et al. | 252/511 |
| 4,898,689 | 2/1990 | Hamada et al. | 252/510 |
| 4,956,203 | 9/1990 | Kroupa | 252/511 |

*Primary Examiner*—Paul Lieberman
*Assistant Examiner*—M. Kopec
*Attorney, Agent, or Firm*—M. Reid Russell

[57] ABSTRACT

An extension type conductive rubber framed by impregnating a cross-linked conductive silicone rubber that contains suspended carbon particles, with a silicone oil having a compatibility with that conductive silicone rubber. The preferred extension type conductive rubber exhibits a predictable decrease in its electrical resistance when extended that directly relates to the magnitude of that extension, and thus can be used as a sensor for sensing various physical quantities such as a displacement, tensile force or pressure on the basis of the relationship between its extension and electrical resistance. In use, first and second electrodes are mounted to a section of the extension type conductive rubber so as to provide a press fit against the rubber and are spaced apart. The electrical resistance across the electrodes or their equivalent structure is sensed during an application of force to the rubber.

11 Claims, 4 Drawing Sheets

EXTENSION TYPE CONDUCTIVE RUBBER AND PROCESS FOR MAKING AND METHOD FOR USING SAME

BACKGROUND OF THE INVENTION

1. Field of the Invention

This invention relates to electrically conductive materials and particularly to a conductive rubber and more particularly to an extension type conductive rubber that decreases its electrical resistance when extended.

2. Prior Art

Heretofore, numerous pressure sensitive conductive rubbers have been developed that contain suspended carbon or conductive metal particles to decrease electrical resistance when compressed. Most of these pressure sensitive conductive rubbers, however, have been of a switching type, that exhibit a sharp decrease in electrical resistance when a pressure is applied thereto. Which material can accordingly present only two discrete states, a high resistance state and a low resistance state. Applications of such switching type conductive rubber are limited to switching devices that perform an on-off action. They cannot be used as a pressure sensor that is required to sense intermediate values. Switching type conductive rubber exhibits such characteristics because it contains larger metal particles having diameters of 30 to 200 microns and the interparticle distances between which particles are small. In addition, the switching type conductive rubber cannot be stretched as it is easily ruptured when stretched due to the larger conducting particles contained therein. Switching type conductive rubber therefore will not present a usable change in its electrical resistance by stretching, as does the extension type rubber of the present invention.

Japanese Patent Publication No. Sho 60-33138, discloses a pressure sensitive conductive rubber formed by impregnating a vulcanized conductive rubber, such as a butadiene rubber (BR) or nitrile rubber (NBR) containing a conductive filler, for example, carbon black or fine metal powders, with a nonvolatile oil. Which nonvolatile oil has compatibility with the conductive rubber so as to swell the rubber and to enlarge interparticle distances of the conductive filler therein. This pressure sensitive conductive rubber, unlike the above-mentioned switching type conductive rubber, gradually decreases its electrical resistance when a pressure applied thereto is increased. Also, it can present a high, intermediate and low electrical resistance states in response to pressure. However, it has shortcomings, that will be discussed later herewith when used as a pressure sensor.

In use, a pressure sensitive conductive rubber is sandwiched between a pair of opposing electrodes. Thereby, when a compression force is applied to the electrodes, the electrical resistance across the electrodes will decrease in response to the magnitude of the applied force. In such arrangement, the electrical resistance across the electrodes involves a contact resistance between the electrodes and the rubber as well as the electrical resistance of the rubber itself. Accordingly, as the compression force is increased, there occurs a slip between surfaces of the electrodes into closer contact with the rubber, thus decreasing the contact resistance. A slip also occurs therebetween as the compression force is decreased, that in turn lessens the contact of the electrodes with the rubber, thus increasing the contact resistance therebetween. In practice, when the compression force is increased, a mechanical frictional resistance between the electrodes and rubber delays the slip and the resultant decrease of the contact resistance, thereby also delaying the decrease of the electrical resistance across the electrodes. Similarly, when the compression force is decreased, the frictional resistance delays the slip and the resulting increase in contact resistance, thereby also delaying the increase of the electrical resistance across the electrodes. Thus, the relation between the force and the electrical resistance across the electrodes presents a hysteresis. Thereby a value of the electrical resistance across the electrodes, i.e., the apparent electrical resistance of the rubber may vary for the same magnitude of applied force. Moreover, a hysteresis loss of the rubber itself due to the creep and stress relaxation is superposed on the above-mentioned hysteresis. Therefore, this pressure sensitive conductive rubber cannot be reliably utilized for a sensor requiring high degree of accuracy.

In addition, the pressure sensitive conductive rubber exhibits poor elasticity and is easily ruptured when stretched. Accordingly, it is not reliable when stretched, as is the extension type conductive rubber of the present invention.

SUMMARY OF THE INVENTION

It is a principal object of the present invention to provide an extension type conductive rubber that will exhibit a predictable decrease in electrical resistance responsive to an extension thereof.

Another object of the present invention is to provide an extension type conductive rubber that will present a predictable high, intermediate and low electrical resistance state in response to extension, and that accordingly can be used as a sensor for sensing various physical quantities such as a displacement, force, or pressure on the basis of a relation between electrical resistance and extension of the conductive rubber.

Still another object of the present invention is to provide an extension type conductive rubber that will substantially not exhibit an apparent hysteresis due to contact resistances between the rubber and electrodes during a force application thereto, and can thereby be applied to a sensor requiring high degree of accuracy.

Still another object of the present invention is to provide a process for making an extension type conductive rubber.

A further object of the present invention is to provide a method for using an extension type conductive rubber when the electrical resistance of that rubber will not exhibit an apparent hysteresis on a change in force application.

The present invention is in an extension type conductive rubber, and a process for making same and a method for its use. To make the extension type rubber, a conductive silicone rubber that is formed from a silicone rubber containing suspended carbon particles such as those of a carbon black or graphite is crosslinked, which particles preferably have a diameter of one (1) to hundreds of millimicrons. Thereafter, the conductive silicone rubber is impregnated, preferably by more than five (5) weight percentage, with a compatible silicone oil, producing the extension type conductive rubber. This extension type rubber, as well as the original non-impregnated, conductive silicone rubber, will exhibit good elasticity and can be stretched without rupture.

The original conductive silicone rubber is conductive even when it is neither extended nor compressed. Impregnating the conductive silicone rubber with silicone oil, however, swells the rubber and enlarges interparticle distances of the imbedded carbon. Thereby, the rubber will exhibit a high electrical resistance when it is in a static state and its resistance will decrease when it is extended or stretched. Thus, the rubber can present high, intermediate and low electrical resistance states in response to the magnitude of an extension force applied thereto and can accordingly be used as a sensor for sensing various physical quantities such as a displacement, tensile force, or pressure directly on the basis of the relation between its electrical resistance and the magnitude of the force applied thereto.

In use, a first and second electrodes are attached to the extension type conductive rubber so as to be closely fitted thereagainst and are spaced apart from one another. So arranged, when a tensile force is applied to the rubber, or a pressure difference is applied to the rubber at the opposite surfaces thereof, so as to extend or stretch the rubber between the electrodes or by an application of a pressure difference between the opposite rubber surfaces, the electrical resistance across the electrodes will decrease in response to that extension. Further, in that stretching the electrical resistance of the rubber will exhibit only a very small hysteresis when the applied force is increased and decreased.

Since the contact resistance between the electrodes and the rubber of the present invention will be substantially unchanged, after assembly, even with an increase or decrease in extension, the contact resistance will remain at a certain value. It should, however, be understood that to measure various physical quantities by a comparison of the actual extension of the extension type conductive rubber of the present invention, that the change in electrical resistance of the rubber, or a measured voltage across the rubber, or the electrical current measured therethrough can be utilized to make such comparison.

BRIEF DESCRIPTION OF THE DRAWINGS

These and other objects and features of the present invention will become more apparent from the following description in which the in,.mention is described in detail in conjunction with the accompanying drawings.

DETAILED DESCRIPTION OF THE EMBODIMENT

EXAMPLE 1

Figure 1:
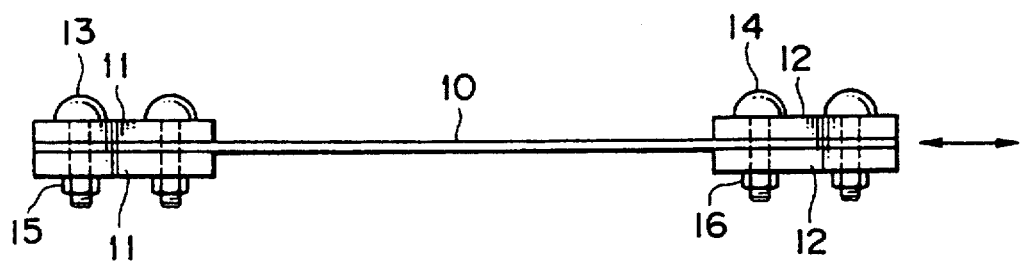
FIG. 1 is a schematic view of a variable resistor of the invention showing a device that includes electrodes wherebetween an extension type conductive rubber is mounted.

FIG. 1 shows a rubber strip 10 with first and second pairs of electrode plates 11 and 12, respectively, sandwiched to opposite ends thereof. The plates are shown with bolts 13 and 14, fitted therethrough with nuts 15 and 16 turned thereon. The electrode plates 11 and 12 are thereby tightly clamping against the rubber strip 10 ends. The distance between the pairs of electrode plates 11 and 12 in this embodiment was approximately 50 mm. Rubber strip 10 was selected to have a width of 5 mm and a thickness of 0.5 mm and cut from a rubber sheet produced by the process of Example 1, as set out herein below. For this example for forming rubber strip 10, conductive silicone rubber, Toray silicone SRX539u, that is a compound of: one hundred (100) parts by weight methyl vinyl silicon crude rubber; twenty five (25) parts by weight acetylene black (a variety of carbon black); and ten (10) parts by weight silicic acid anhydride, manufactured by Toray K. K., that contains suspended carbon black particles, was added to 4.5 parts by weight of a cross-linker, RC-3 (40P) that is forty percent (40%) dicumyl peroxide and sixty percent (60%) polydimethylsiloxane manufactured by Toray K. K., which mix was formed into a rubber sheet of approximately 0.5 mm in thickness by a calender roller. Thereafter, the rubber sheet was heated at 150° C. for about 10 minutes so as to obtain cross-linking. After being subjected to a secondary cross-linking at 200° C. for four (4) hours, the rubber sheet was dipped into a silicone oil, at 70° C. for 24 hours, a Toray silicon oil SH-200, that is a polydimethylsiloxane, 100/cs, manufactured by Toray K. K., having a compatibility with the conductive silicone rubber, becoming impregnated therewith. Compatibility, in the art of polymer chemistry, refers to the degree of intimacy of blends of polymers. A plurality of polymers that do not exhibit symptoms of segregation or separation when combined are deemed to be compatible. As applied to the present invention, a lack or failure of compatibility between the silicon oil and silicone rubber results in the molecules of the silicon oil not entering between the silicon rubber molecules. The percentage of impregnation for this example was 25 percent by weight.

Figure 2:
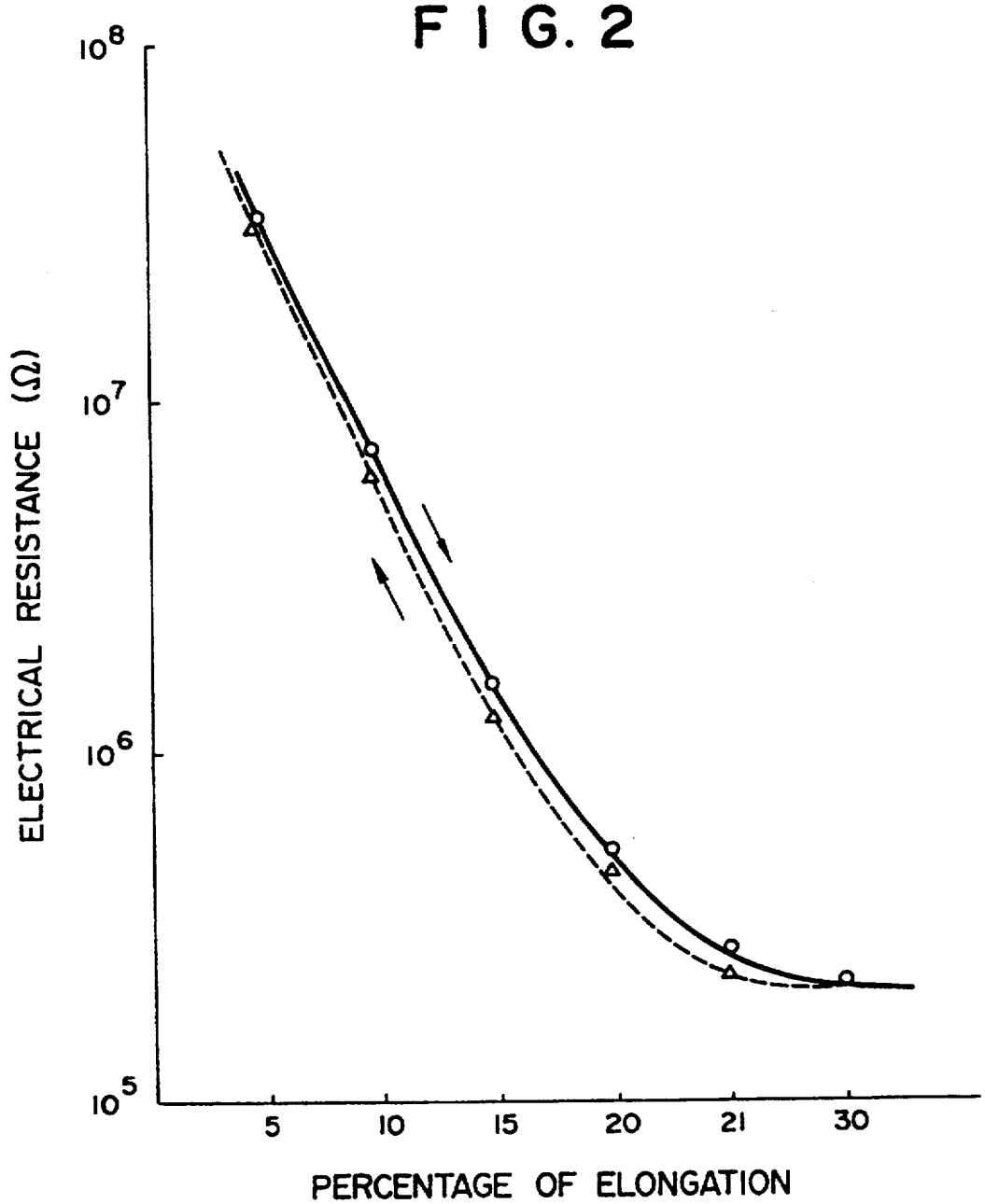
FIG. 2, a graph showing a characteristic curve of the relation between the percentage of elongation of the extension type conductive rubber of Example 1 and the electrical resistance measured across the electrodes.

The graph of FIG. 2 shows a characteristic curve of a change in electrical resistance with change in elongation of the rubber strip 10 formed as described in Example 1 above. With the first pair of electrode plates 11 held stationary the second pair of electrode plates 12 was moved to stretch the rubber 10 that was then allowed to relax to its original position (of course both pairs of electrode plates 11 and 12 can be moved apart to stretch the rubber strip 10). FIG. 2 shows a characteristic curve illustrating the relation between the percentage of elongation of the rubber strip 10 and the electrical resistance measured across the electrode plates 11 and 12 during the elongation. The electrical resistance is shown to gradually change in response to the change in the elongation of the rubber strip 10, and is shown to present only a small hysteresis.

The above demonstrates the relationship of the measured electrical resistance across the electrode plates or its equivalences, such as voltage or an electric current that is passed through the rubber during an elongation, i.e., the displacement of the electrode plates as compared to the percentage of elongation or tensile force applied to the rubber.

In addition, it should be understood that the arrangement as shown in FIG. 1 can be used for testing an elongation-electric resistance characteristic of an extension type of conductive rubber. Further, through the bolts 13 and 14 and nuts 15 and 16 are shown for sandwiching the electrodes 11 and 12 against the rubber in the arrangement of FIG. 1, other means can be utilized for the same purpose within the scope of this disclosure. Further, it should be understood that each of the first and second electrodes is not necessarily required to be a pair of electrodes arranged to sandwich the conductive rubber ends so long as such alternative arrangement provides a press fit of the conductive against the conductive rubber.

EXAMPLE 2

For this example for forming rubber strip 10, one hundred (100) parts by weight of the same conductive silicone rubber as utilized in Example 1 was added to 4.5 parts by weight of the same cross-linker as was utilized in Example 1. As set out in Example 1, this mix was formed into a rubber sheet of approximately 0.5 mm in thickness by a calender roller. Thereafter, the rubber sheet was heated at 150° C. for about 10 minutes so as to obtain cross-linking. The sheet was subjected to a secondary cross-linking at 200° C. for four (4) hours, and was then dipped into a silicone oil, a Toray silicone oil SH-200, that is polydimethlsiloxane, 350 cs, manufacture by Toray K. K., having a compatibility with the conductive silicone rubber. This dipping was at 70° C. for 24 hours to impregnate the sheet rubber with the silicone oil. The percentage by weight of this impregnation of this example was 17.

Figure 3:
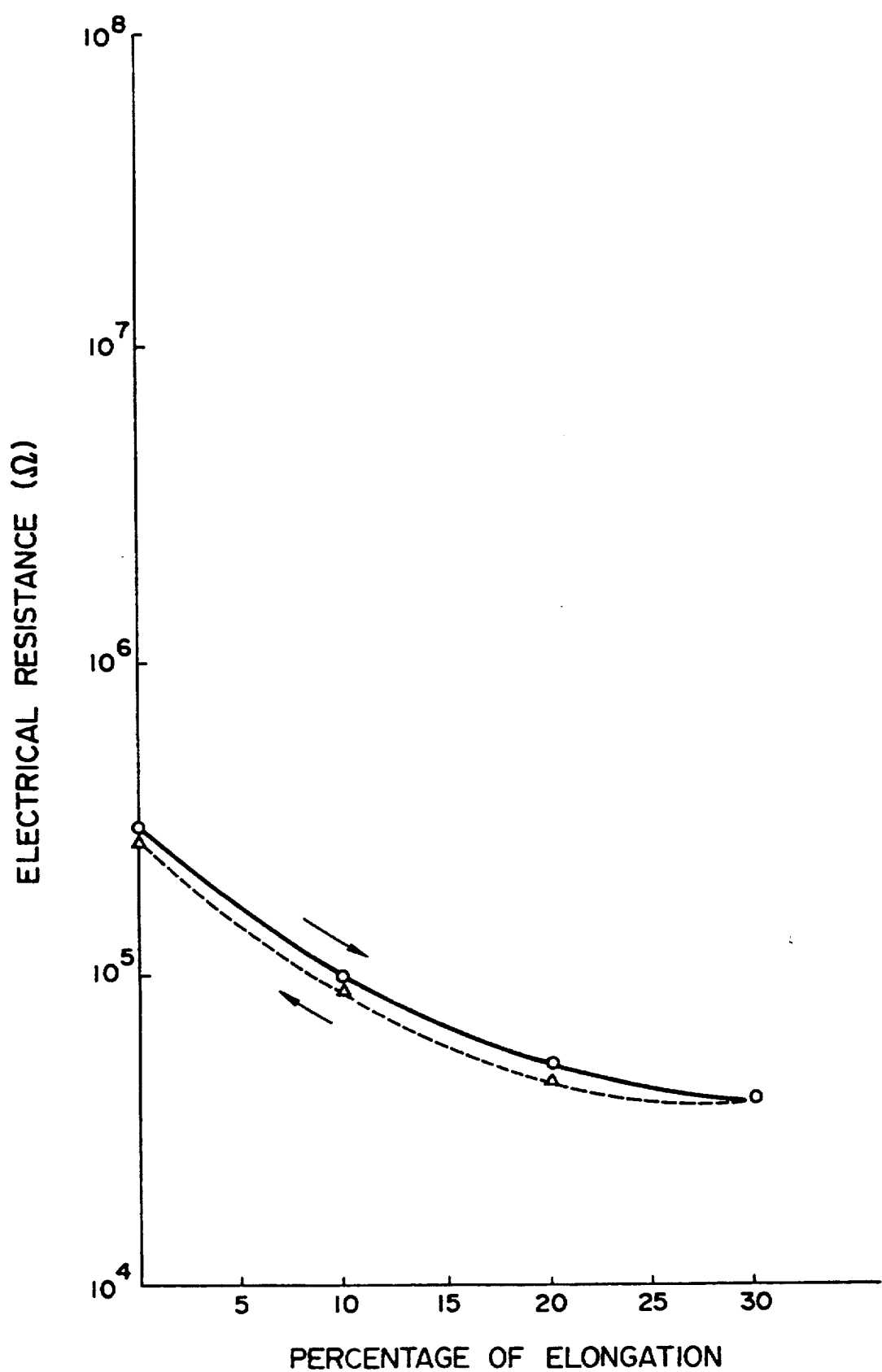
FIG. 3, a graph showing a characteristic curve that is like that of FIG. 2, showing the relation between the percentage of elongation of the extension type conductive rubber of Example 2 and the electrical resistance measured across the electrodes.

The graph of FIG. 3 shows a characteristic curve illustrating the relation between the percentage of elongation of the extension type conductive rubber of this Example 2 and the electrical resistance measured across the electrode plates 11 and 12, which relationship was obtained in the same manner as was the graph of FIG. 1.

EXAMPLE 3

For this example for forming rubber strip 10, on hundred (100) parts by weight of a conductive silicone rubber, KE-3601U, that is a compound of: one hundred (100) parts by weight methyl vinyl silicon crude rubber; twenty five (25) parts by weight acetylene black (a variety of carbon black); and ten (10) parts by weight silicic acid anhydride, manufactured by Shinetu Kagaku K. K., that contains suspended carbon black particles was added to five (5) parts by weight of a cross-linker, C-3, that is forty percent (40%) dicumyl peroxide and sixty percent (60%) polydimethylsiloxane, manufactured by Shinetu Kagaku K. K. The mix was formed into a rubber sheet of approximately 0.5 mm in thickness and 50 mm in width by a calendar roller. Thereafter, the rubber sheet was heated at in hot air of 220° C. for about ten (10) minutes so as to obtain cross-linking. After being subjected to a secondary cross-linking at 200° C. for four (4) hours, to impregnate the sheet it was dipped into a silicone oil, Toray silicone oil SH-200, that is a polydimethylsiloxane, 50 cs manufactured by Toray K. K., that has a compatibility with the conductive silicone rubber, at 100° C. for 24 hours. The percentage of impregnation of this example was 48 by weight.

Figure 4:
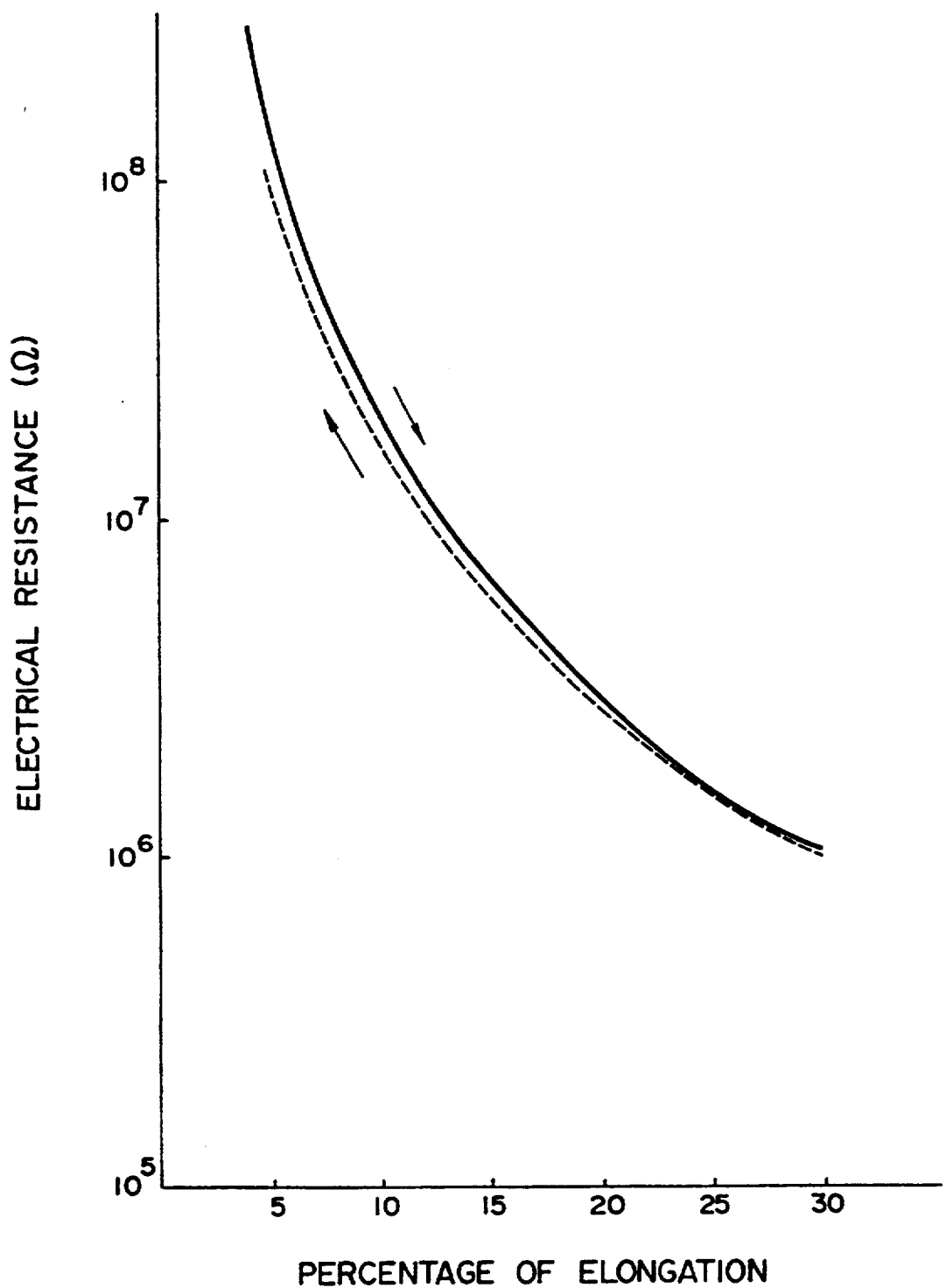
FIG. 4, a graph showing a characteristic curve like that of FIGS. 2 and 3, showing the relation between the percentage of elongation of the extension type conductive rubber of Example 3 and the electrical resistance measured across the electrodes.

The graph of FIG. 4 shows a characteristic curve illustrating the relation between the percentage of elongation of the extension type conductive rubber of this Example 3 and the electrical resistance measured across electrode plates 11 and 12 sandwiched thereagainst, which relation was obtained in the same manner as was the graph of FIG. 1.

EXAMPLE 4

For this example for forming rubber strip 10, one hundred (100) parts by weight of a conductive silicone rubber, YE3452UB, that is a compound of: one hundred (100) parts by weight methyl vinyl silicone crude rubber; twenty five (25) parts by weight acetylene black (a variety of carbon black); and ten (10) parts by weight silicic acid anhydride, manufactured by Toshiba K. K., containing suspended carbon black particles was added to three (3) parts by weight of a cross-linker, CT-8, that is fifty percent (50%) 2,5-dimethyl-2,5-ditertiarybutyl-peroxyhexane; and fifty percent (50%) polydimethylsiloxane, manufactured by Toshiba K. K. and the mix was formed into a rubber sheet of approximately 0.5 mm in thickness by a calender roller. Thereafter, the rubber sheet was heated at 170° C. for about 10 minutes so as to obtain cross-linking. After being subjected to a secondary cross-linking at 200° C. for four (4) hours, the rubber sheet was dipped into a silicone oil, Toray silicone Oil SH-200, that is a polydimethylsiloxane, 3000 cs, manufactured by Toray K. K., that has a compatibility with the conductive silicone rubber, at room temperature for five (5) hours, providing an impregnated sheet. The sheet was then taken out of the silicone oil and heated in hot air to a temperature of 100° C. for 24 hours. The percentage of impregnation of this example was 6.2 by weight.

Figure 5:
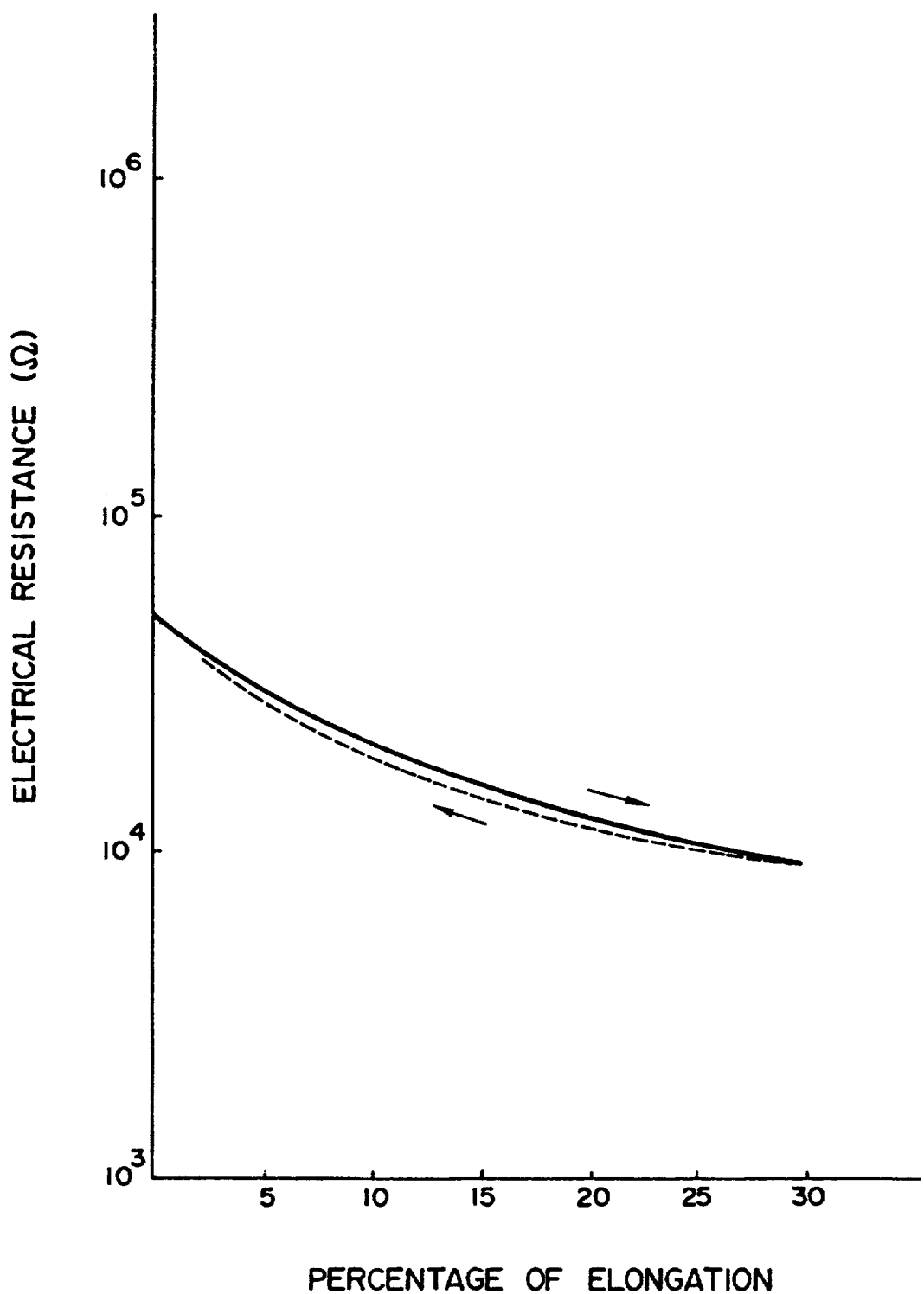
FIG. 5, a graph showing a characteristic curve like that of FIGS. 2, 3 and 4, that illustrates the relation between the percentage of elongation of the extension type conductive rubber of Example 4 and the electrical resistance measured across the electrodes.

The graph of FIG. 5 is a characteristic curve illustrating the relation between the percentage of elongation of the extension type conductive rubber of this Example 4, and the electrical resistance measured across the electrode plates 11 and 12 that are sandwiched thereagainst, which relation was obtained in the same manner as was the graph of FIG. 1.

While preferred embodiments of the present invention in an extension type conductive rubber, its use and a process for making same have been shown and described herein, it should be apparent that the present disclosure is made by way of example only and that variations thereto are possible within the scope of the disclosure without departing from the subject matter coming within the scope of the following claims and a reasonable equivalency thereof, which claims I regard as my invention.

I claim:

1. An extension conductive rubber formed by impregnating a cross-linked conductive silicone rubber that contains suspended carbon particles at a ratio of ten to eighty parts by weight for one hundred parts by weight of said conductive silicone rubber with a silicon oil that has a compatibility with said conductive silicone rubber whereby said extension conductive silicone rubber will exhibit high electrical resistance value when it is not under deformation and will exhibit a decrease in its electrical resistance value in response to a magnitude of extension deformation applied thereof.

2. An extension conductive rubber as set forth in claim 1, wherein the conductive silicone rubber is a compound of methyl vinyl silicone crude rubber, acetylene black and silicic acid anhydride, the carbon particles are carbon black.

3. An extension conductive rubber as set forth in claim 1, wherein the percentage of silicone oil to the conductive silicone rubber is more than five percent by weight, for a weight of cross-linked conductive silicone rubber of one hundred percent, to saturation.

4. An extension conductive rubber as set forth in claim 1, wherein the cross-linking of the conductive silicone rubber is accomplished by subjecting the conductive silicone rubber and a cross-linking agent to heat.

5. A process for making an extension conductive rubber comprising the steps of:
  (a) cross-linking a conductive silicone rubber formed of a silicone rubber, said silicone rubber containing suspended carbon particles at a ratio of ten to eighty parts by weight for one hundred parts by weight of said conductive silicone rubber; and
  (b) impregnating said cross-linked conductive silicone rubber with a silicone oil that has a compatibility with said conductive silicone rubber and which oil interacts to enlarge the molecular distances between said conductive silicone rubber molecules.

6. A process for making an extension conductive rubber as set forth in claim 5, wherein the conductive silicone rubber is a compound of methyl vinyl silicone crude rubber, acetylene black and silicic acid anhydride, the carbon particles are carbon black.

7. A process as set forth in claim 5, wherein the percentage of silicone oil to the conductive silicone rubber is more than five percent by weight for a weight of cross-linking conductive silicone rubber of one hundred percent, to saturation.

8. A process for making an extension conductive rubber as set forth in claim 5, wherein the cross-linking of the conductive silicone rubber is accomplished by subjecting a mix of the conductive silicone rubber with a cross-linking agent to heat.

9. A process for making an extension conductive rubber as set forth in claim 5, wherein the conductive silicone rubber is soaked in the silicone oil for approximately twenty-four hours.

10. A process for making an extension conductive rubber as set forth in claim 7, wherein the carbon particles are graphite, the silicon oil is a polydimethylsiloxane and the percentage of silicone oil to the conductive silicone rubber is more than five percent by weight to saturation.

11. An extension conductive rubber as set forth in claim 3, wherein the carbon particles are graphite, the silicone oil is a polydimethylsiloxane and the percentage of silicone oil to the cross-linked conductive silicone rubber is more than five percent by weight to saturation.

* * * * *